Oct. 16, 1945.  W. M. DOEHRING  2,387,128
TOOL
Filed March 6, 1943
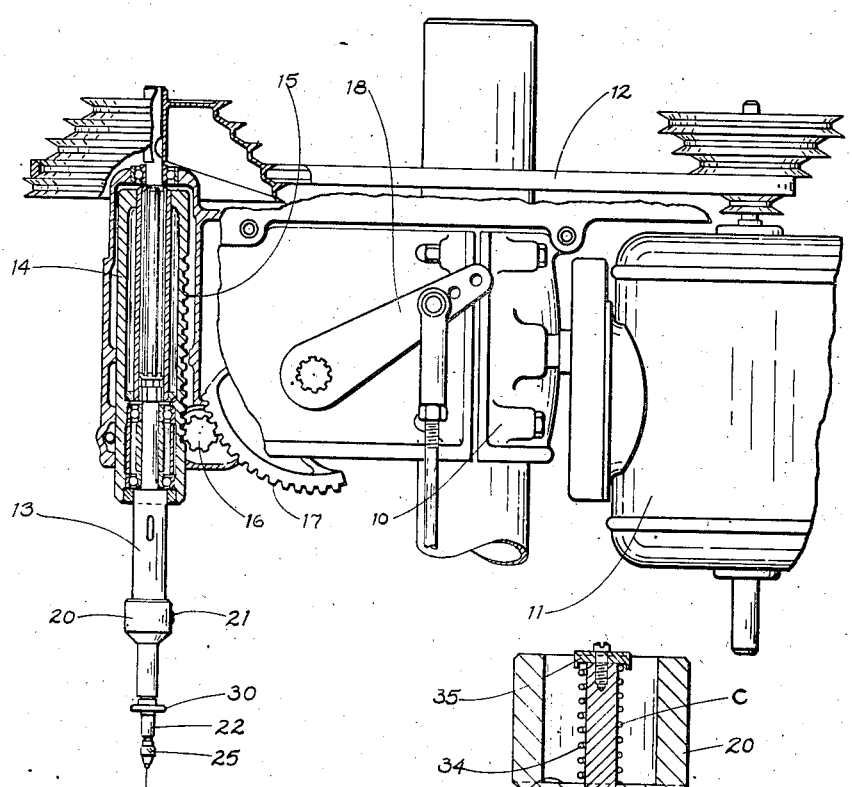
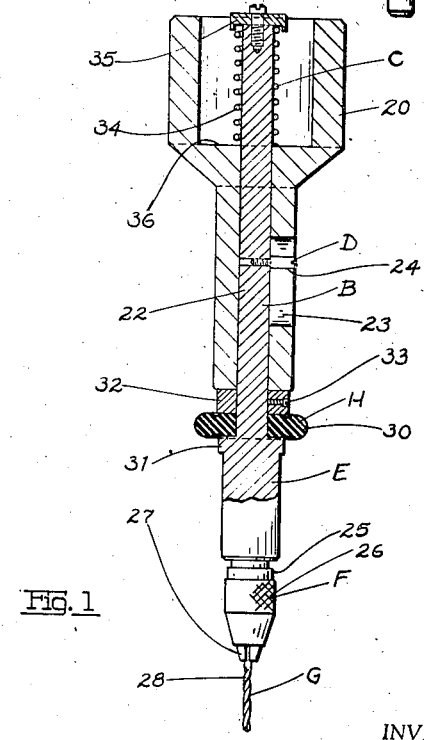
Fig. 2
Fig. 1
INVENTOR.
W. M. Doehring
BY Edward T. Noé
ATTORNEY.

Patented Oct. 16, 1945

2,387,128

UNITED STATES PATENT OFFICE 2,387,128

TOOL

Walter M. Doehring, Dayton, Ohio, assignor to The Sheffield Corporation, Dayton, Ohio, a corporation of Ohio Application March 6, 1943, Serial No. 478,204

2 Claims. (Cl. 77—32)

This invention relates to machine tools and more particularly to tools embodying a drill or the like of a comparatively delicate construction or of small diameter.

One object of the invention is the provision of a holder for slender drills and the like, having provision for manually controlling the drill feed under the direct manual control of the thumb and finger of an operator, against the action of a light spring, and embodying a spindle construction in which the drive holder is axially movable and which is adapted for readily detachable connection to the power driven shaft of a drill press.

Another object is the provision, in a drill press having a power driven shaft and means under the control of the operator for raising and lowering the shaft to raise and lower the drill with respect to the work, of a spindle and holder assemblage which is adapted for readily detachable connection with the power driven shaft of the press and in which the holder is of comparatively small weight or inertia compared with the power driven shaft, such holder being spring supported in the spindle and adapted to be manually controlled directly by the operator to feed the drill into the work so that drills of very small diameter can be used effectively.

Other objects and advantages of the invention will be apparent from the following description, the appended claims and the accompanying drawing, in which, Fig. 1 is a vertical sectional view of a tool embodying the present invention, and Fig. 2 shows a portion of a drill press in which the tool is arranged.

Referring more particularly to the drawing, in which the same reference numerals have been used to designate like parts in the several views, 10 designates the upper portion of a drill press, having a motor 11 connected by suitable transmission means 12 to a power driven member 13. This member 13 is a rotatable shaft section which is vertically movable under the control of a sleeve 14 which has teeth 15 at one side thereof meshing with an idler gear 16 that is operated by a gear segment 17. Lever 18, adapted to be manually controlled by the operator, provides for raising and lowering the power driven shaft 13. The lower end of the shaft 13 is adapted to be detachably connected to a tool holder, in any customary manner.

As will be apparent from Fig. 1 of the drawing in which the tool and holder construction is shown, the tool comprises a spindle 20 having a head portion which telescopes the lower end of the power driven shaft 13. The spindle is connected to the shaft as by means of a suitable set screw, a portion of which is shown at 21 in Fig. 2. Arranged within the spindle 20 is a bar or holder 22, adapted for axial movement therein and coaxial with the spindle. The spindle is provided with a vertical slot 23, and a pin 24 arranged in the slot and fixed to the holder 22 causes the holder to be rotated with the spindle but permits substantial axial movement. At its lower end, the holder 22 is fixed to a drill chuck 25 having a rotatable clamp sleeve 26 which tightens or loosens the clamp jaws 27. The latter provide a securing means for holding a drill 28 of small diameter or of slender or delicate construction. This drill may have a diameter measured in thousandths of an inch.

Rotatably arranged on the holder 22 is a collar or disc 30 engaging against a shoulder portion 31 of the holder and held against axial movement on the holder by a ring 32 which is held by set screw 33 in such position as to permit free rotation of the holder 22 when the collar 30 is grasped and held by the operator. The upper side of the ring 32 normally rides against the bottom of the spindle 20, and is held up against the spindle 20 by means of a spring 34 interposed between a cap plate 35 fixed to the upper end of the holder, and a wall 36 of the head of the spindle. The spring is of substantial length and is comparatively weak in the force it exerts on the holder although it is strong enough to overcome the weight of the holder and the parts attached to the holder, such as the chuck and the drill. Its substantial length permits a considerable movement of the holder in a downward direction with respect to the spindle.

The holder 22 together with the drill chuck are of comparatively small weight and inertia compared to the power driven shaft 13 by which it is driven. The operator by grasping the collar 30 between his thumb and forefinger promptly stops the rotation of this collar, and by pressing on the collar he obtains a very delicate control of the pressure applied to the drill in the drilling operation. After previously adjusting the lever 18 to lower the power driven shaft 13 into a position where the end of the drill is only a little above the workpiece to be machined, he then controls the drilling pressure entirely by the collar 30 and by moving the drill and the holder downwardly with respect to the spindle against the action of the spring 34. As the parts thus moved by the thumb and forefinger of the operator are comparatively light in weight, the operator merely has to overcome the comparatively light overbalancing force of the spring, and the reaction of the drill and the work in drilling; and a comparatively long, small diameter drill can be used repeatedly without harming it by the application of excessive pressures.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A tool of the character described comprising a spindle adapted to be detachably connected to a power driven shaft of a drill press for rotation and support thereby, a holder rotatable with said spindle and axially movable therein, a chuck at one end of said holder adapted to releasably hold a drill, a collar on said holder adapted to be grasped and moved manually to feed the holder towards the work, said collar being mounted for rotation on said holder, and a spring arranged between the holder and the spindle and urging said holder in a direction to lift the holder from the work, said spring exerting a force on said holder only slightly in excess of the weight of the holder and the parts held thereby otherwise the holder being supported for free axial movement in the spindle, to provide a sensitive direct manual control of the holder.

2. In a drilling machine having a power driven member and means for raising and lowering said member, a spindle adapted at its upper end for detachable connection to said driven member for rotation thereby, a holder of comparatively small weight compared with said power driven member and axially movable in said spindle, means interconnecting said spindle and holder for simultaneous rotation, a drill chuck at the lower end of said holder and adapted to carry delicate drills, a collar rotatably mounted on said holder and adapted to be grasped between the thumb and finger of an operator and to be moved thereby to feed the chuck towards the work location, and a spring interposed between said spindle and holder and overcoming the weight of the holder and chuck and adapted to be readily overcome by manual pressure on the collar, the holder being supported for free axial movement in the spindle, to provide a direct manual feed of the drill chuck under the control of the thumb and finger of the operator.

WALTER M. DOEHRING.